United States Patent
Pang

(10) Patent No.: US 7,470,034 B2
(45) Date of Patent: Dec. 30, 2008

(54) LIGHT GUIDE WITH INDIRECT LIGHT SOURCE

(75) Inventor: Siew It Pang, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 378 days.

(21) Appl. No.: 11/392,890

(22) Filed: Mar. 29, 2006

(65) Prior Publication Data

US 2007/0236958 A1 Oct. 11, 2007

(51) Int. Cl.
*F21V 13/04* (2006.01)

(52) U.S. Cl. .................... 362/29; 362/27; 362/612; 362/613

(58) Field of Classification Search .................... 362/29, 362/30, 612, 613
See application file for complete search history.

(56) References Cited

U.S. PATENT DOCUMENTS

| 4,096,550 | A | * | 6/1978 | Boller et al. | 362/627 |
| 4,257,084 | A | * | 3/1981 | Reynolds | 362/601 |
| 4,714,983 | A | * | 12/1987 | Lang | 362/27 |
| 5,664,862 | A | * | 9/1997 | Redmond et al. | 362/625 |
| 7,125,152 | B2 | * | 10/2006 | Lin et al. | 362/609 |
| 7,175,329 | B1 | * | 2/2007 | Chou | 362/612 |
| 2006/0158901 | A1 | * | 7/2006 | Wang | 362/612 |

* cited by examiner

*Primary Examiner*—Sandra O'Shea
*Assistant Examiner*—James W Cranson

(57) ABSTRACT

An embodiment of the invention is an improved light guide having one or more light sources inserted into the light guide such that the light sources are perpendicular to the main axis of the light guide. The light sources are inserted into a cavity within the outer wall of the light guide. The cavity is positioned at one end of the light guide.

18 Claims, 1 Drawing Sheet

LIGHT GUIDE WITH INDIRECT LIGHT SOURCE

CROSS-REFERENCE TO RELATED APPLICATIONS

Not applicable.

TECHNICAL FIELD

The application relates in general to a light guide with an indirect light source, and more specifically to a light guide that has a parabolic shaped contour at the level which a light source is inserted, wherein the light source typically comprises one or more light-emitting diodes that are inserted perpendicular to the main axis of the light guide.

BACKGROUND OF THE INVENTION

Light guides are devices used to transport light from a light source to a distant point with minimal loss. The light is transmitted through a light guide by means of internal reflection. Light guides are typically made of optical grade materials such as acrylic resin, polycarbonades, epoxies, silicones, and glass.

Typical uses for light guides include transmission of light from an LED lamp or a PC board to a front panel for status indication, collection and direction of light to backlight an LCD display or legend, and illuminating a grid pattern on a see-through window.

A typical light guide arrangement compromises a light source, such as a light-emitting diode placed at one end of the light guide. The light source is oriented such that the central light path is aligned with the main axis of the light guide.

A major drawback with this arrangement is that the ability to link the LED to a heat sink is severely limited by the space provided for the LED backlighting.

In the case of a multi LED light guide each LED is placed at one end of a light guide. Again the central light path is aligned with the main axis of the light guide.

In the prior art, the placement of the LED results in dark spots affecting the color and brightness of the light and in hot spots between the LEDs. In addition, as with the single LED light guide, the ability to transfer heat to a heat sink or similar device is limited.

BRIEF SUMMARY OF THE INVENTION

The invention is an improved light guide having a cavity at one end into which one or more light sources an be inserted. The cavity is created in the side wall of the light guide so that the light source, when inserted, is perpendicular to the main axis of the light guide. The light source is monitoring on a substrate which, in turn, is attached to the side wall of the light guide.

Another embodiment includes a light guide which provides uniform light mixing between multiple LEDs, and allows for the attachment of heat sinks such that sufficient heat can be drawn away from the light source.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

An embodiment of the invention includes having a light guide having one or more light sources, such as, light-emitting diodes (LEDs), in a cavity within the side wall of the light guide. The LED is inserted perpendicular to the main axis of the light guide. This permits the LED to more closely associate with heat dispersion devices such as heat sinks, and, in the case of multiple LEDs, promotes better light mixing.

Figure 1:
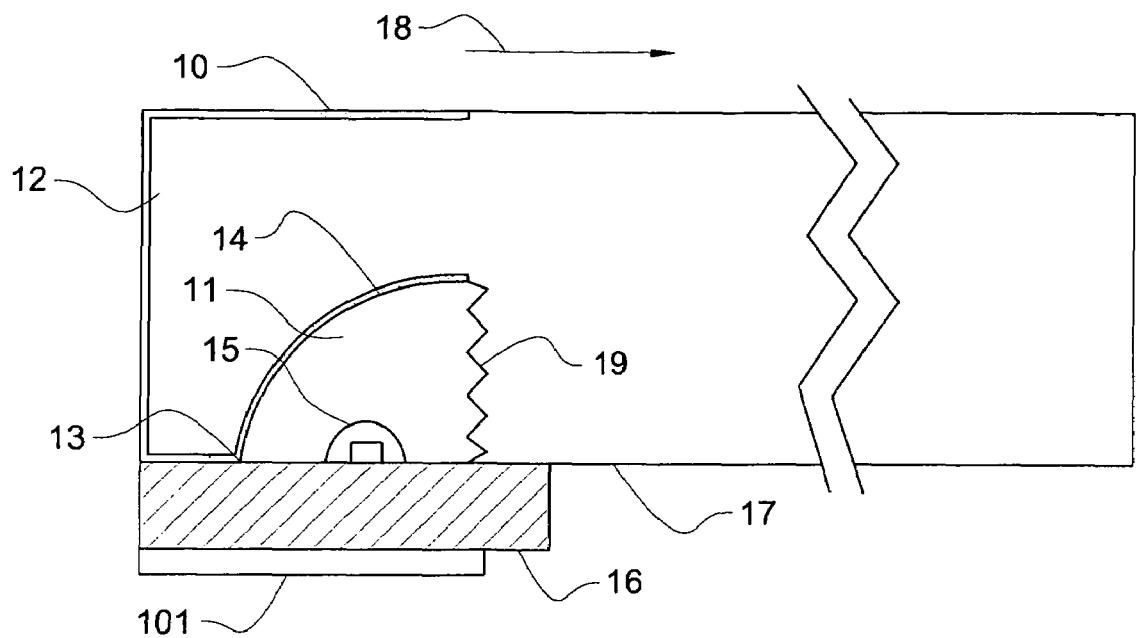
FIG. 1 is a cross section of a light guide arranged according to an embodiment of the present invention.

Turning to FIG. 1, a light guide 10 is provided having a cavity 11 located in side wall 17 at one end 12 of light guide 10. Cavity 11, can be any convenient shape, including the semi-parabolic shown in FIG. 1. The vertex 13 of the semi-parabolia cavity 11 is located near the end of light guide 12. In one embodiment, at least a portion of the surface of the cavity 11 can be coated with reflective material 14. Coating 14 can extend out to cover the entire end of light guide 12. The reflective coating helps ensure that the light emitted by light source 15 is directed along the main axis 18 of light guide 10.

Cavity 11 should be large enough to permit the insertion of a light source such as a LED 15 into the cavity such that light source 15 may be perpendicular to axis 18 of the light guide.

Again referring to FIG. 1, the light source 15 is attached to a suitable substrate 16. The substrate can be prepared from such materials as PCB, metals, polycarbonates, and the like. Substrate 16 is directly attached to the side wall 17 of the light guide to hold light source 15 in place.

Substrate 16 can be associated with a heat dissipation devise 101, which may include a heat spreader, a heat sink, or an external metal casing. The presence of a heat dissipation device permits dissipation of heat away from the light source.

Figure 2:
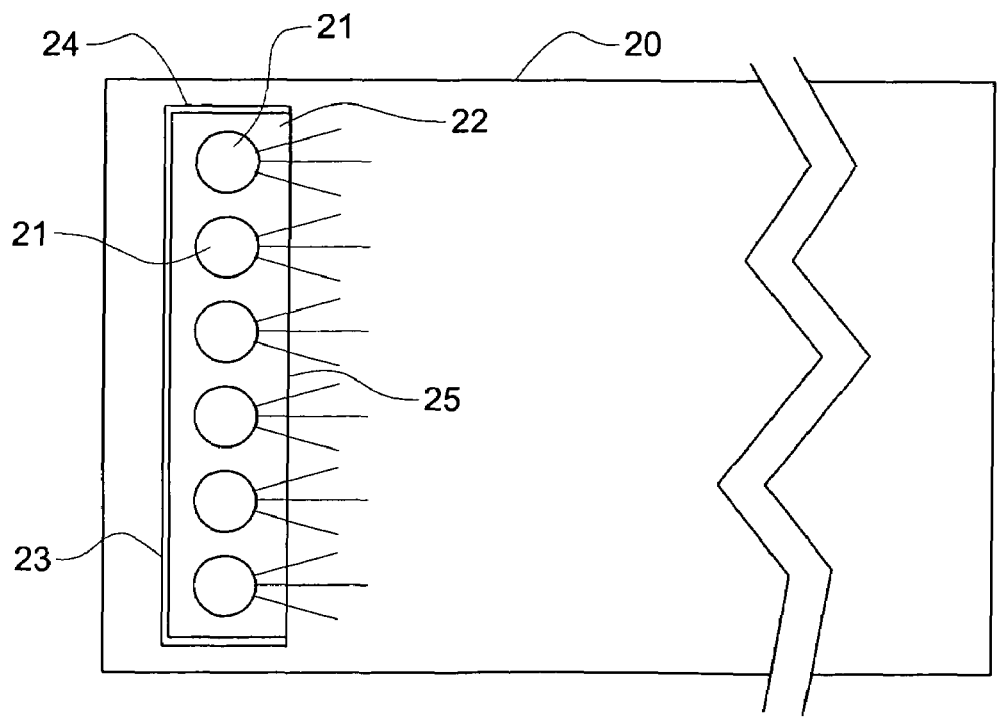
FIG. 2 is a cross section showing the placement of multiple LEDs within a light guide according to an embodiment of the invention.

Turning now to FIG. 2, light guide 20 is shown having multiple light sources 21. In this case, cavity 22 extends across the width of light guide 20 such that two or more light sources 21 may be inserted into the cavity. As with the single light source cavity shown in FIG. 1, cavity 22 can be of any shape, but will typically have a semi-parabolic contour. Again, at least a portion of cavity walls 24 may be coated with a reflective material 23. As with the single light source guide 15 in FIG. 1, the light sources 21 in FIG. 2 are attached to a substrate which is attached to the light guide 20. By placing multiple light sources such as LEDs in the shaped cavity, better light supply is achieved. This, in turn, reduces the formation of dark spots improving the final color and brightness.

In the case of both the single light source light guide shown in FIG. 1 and the multiple light source light guide shown in FIG. 2, the front wall of the cavities, 19 and 25 are left uncoated to permit transmission of light into the light guide. In one embodiment (shown in FIG. 1) front wall 19 may be textured so as to better disperse the light entering the light guide resulting in better mixing of the light.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A light guide comprising:
   a cavity at one end of the light guide; and
   a light source inserted into said cavity such that the light source is perpendicular to the main axis of the light guide;
   wherein the cavity has a semi-parabolic shape.

2. The light guide of claim 1 wherein the light source comprises one or more light-emitting diodes.

3. The light guide of claim 1 wherein the light source is attached to a substrate, which is attached to an outer surface of the light guide.

4. The light guide of claim 1 wherein at least a portion of the cavity is coated with a light reflective material.

5. The light guide of claim 3 wherein the substrate is associated with a heat dissipation device.

6. The light guide of claim 5 wherein the heat dissipation device is selected from the group consisting of: a heat sink, a heat spreader, and an external metal casting.

7. The light guide of claim 1 wherein the cavity has a front wall which has been textured to disperse the light generated by the light source.

8. A light guide comprising:
   a cavity at one end of the light guide;
   one or more light-emitting diodes inserted into said cavity; and
   said diodes being attached to a substrate which is attached to an outer wall of the light guide;
   wherein the cavity has a semi-parabolic shape.

9. The light guide of claim 8 wherein said cavity is defined by a cavity wall having a reflective material.

10. The light guide of claim 8 wherein said cavity has a front wall which permits the flow of light from said LED into said light guide.

11. The light guide of claim 8 wherein said front wall has been textured to disperse and mix the light entering the light guide.

12. The light guide of claim 8 wherein the substrate is associated with a heat dissipation device.

13. A light guide comprising:
    a cavity in the outer wall of the light guide;
    said cavity having a semi-parabolic shape; and
    one or more light sources inserted into said cavity.

14. The light guide of claim 13 wherein the light source is perpendicular to the main axis of the light guide.

15. The light guide of claim 13 wherein the light source is a light-emitting diode.

16. The light guide of claim 13 wherein at least a portion of the surface of said cavity is coated with a reflective material.

17. The light guide of claim 13 wherein the light source is attached to a substrate, which is attached to the outer wall of the light guide.

18. The light guide of claim 13 wherein the cavity has a front wall which has been textured to diffuse and blend the light produced by the light source.

* * * * *